United States Patent
Hiramatsu et al.

(10) Patent No.: US 7,781,053 B2
(45) Date of Patent: Aug. 24, 2010

(54) POROUS OBJECT BASED ON SILICON CARBIDE AND PROCESS FOR PRODUCING THE SAME

(75) Inventors: Takuya Hiramatsu, Nagoya (JP); Shinji Kawasaki, Nagoya (JP)

(73) Assignee: NGX Insulators, Inc., Nagoya (JP)

( * ) Notice: Subject to any disclaimer, the term of this patent is extended or adjusted under 35 U.S.C. 154(b) by 0 days.

(21) Appl. No.: 12/194,015

(22) Filed: Aug. 19, 2008

(65) Prior Publication Data

US 2009/0017283 A1     Jan. 15, 2009

Related U.S. Application Data

(63) Continuation of application No. PCT/JP2007/051505, filed on Jan. 30, 2007.

(30) Foreign Application Priority Data

Feb. 22, 2006  (JP) ............................. 2006-045419

(51) Int. Cl.
  *B32B 3/26* (2006.01)
  *C04B 35/64* (2006.01)

(52) U.S. Cl. ............... 428/312.6; 428/317.7; 428/317.9; 428/446; 423/439; 501/80; 501/88; 264/413; 264/414; 264/628; 264/624; 264/625; 264/44

(58) Field of Classification Search ....................... None
See application file for complete search history.

(56) References Cited

U.S. PATENT DOCUMENTS

2003/0134084 A1    7/2003    Ichikawa et al.

| 2004/0051196 A1 | 3/2004 | Otsuka et al. |
| 2005/0140069 A1 | 6/2005 | Ichikawa |
| 2005/0158534 A1 | 7/2005 | Tabuchi et al. |
| 2007/0082174 A1 | 4/2007 | Masukawa et al. |
| 2007/0225149 A1 | 9/2007 | Hayashi et al. |

FOREIGN PATENT DOCUMENTS

| EP | 1 588 995 A1 | 10/2005 |
| JP | A-06-182228 | 7/1994 |
| JP | A-2001-206785 | 7/2001 |
| JP | A-2002-201082 | 7/2002 |

(Continued)

OTHER PUBLICATIONS

Nov. 4, 2009 Office Action issued in U.S. Appl. No. 12/193,961.

(Continued)

*Primary Examiner*—Ling Xu
(74) *Attorney, Agent, or Firm*—Oliff & Berridge, PLC

(57) ABSTRACT

Provided are a silicon carbide-based porous article comprising silicon carbide particles as an aggregate, metallic silicon and an aggregate derived from organometallic compound particles to form pores through volume shrinkage due to decomposition/conversion by heat treatment; and a method for producing the silicon carbide-based porous article, comprising, adding organometallic compound particles to form pores through volume shrinkage due to decomposition/conversion by heat treatment to a raw-material mixture containing silicon carbide particles and metallic silicon, then forming into an intended shape, calcinating and/or firing the resultant green body, forming pores through volume shrinkage due to decomposition/conversion of the organometallic compound particles, and the decomposed/converted substance of the organometallic compound particles being present as an aggregate in the porous article.

12 Claims, 1 Drawing Sheet

FOREIGN PATENT DOCUMENTS

| JP | A-2003-238271 | 8/2003 |
| JP | A-2003-342076 | 12/2003 |
| WO | WO 03/082770 A | 10/2003 |
| WO | WO 03/082770 A1 | 10/2003 |
| WO | WO 2005/089901 A1 | 9/2005 |
| WO | WO 2005/090263 A1 | 9/2005 |

OTHER PUBLICATIONS

Feb. 27, 2007 International Search Report issued in International Application No. PCT/JP2007/051506.

Ozcivici et al., Fabrication and Characterization of Ceramic Foams Based on Silicon Carbide Matrix and Hollow Alumino-Silicate Spheres, Journal of the American Ceramics Society, Dec. 1, 2005, pp. 3338-3345, vol. 88, No. 12, Blackwell Publishing, Malden, MA, USA.

Feb. 12, 2010 Supplementary European Search Report issued in Application No. 07707724.6-2111 / 2006261 PCT/JP2007051506, which is a counterpart of co-pending U.S. Appl. No. 12/193,961.

Mar. 23, 2010 Final Office Action issued in U.S. Appl. No. 12/193,961.

POROUS OBJECT BASED ON SILICON CARBIDE AND PROCESS FOR PRODUCING THE SAME

This is a Continuation of International Application No. PCT/JP2007/051505 filed Jan. 30, 2007, which claims the benefit of Japanese Application No. 2006-045419 filed Feb. 22, 2006. The disclosure of the prior applications is hereby incorporated by reference herein in its entirety.

TECHNICAL FIELD

The present invention relates to a silicon carbide-based porous article suitable for use as a material constituting mainly a filter for purification of automobile exhaust gas, a catalyst carrier or the like, and to a method for producing the same.

BACKGROUND ART

A porous honeycomb structure constituted by cell partition walls (ribs) forming an assemblage of a plurality of cells adjacent to each other and a honeycomb outer wall surrounding and holding the outermost cells constituting the circumference of the assemblage of cells is in wide use as a filter (a diesel particulate filter, i.e. a DPF) for trapping and removing the particulate matter contained in a particle-containing fluid such as diesel engine exhaust gas or a catalyst carrier for carrying a catalyst component for purification of harmful substance in exhaust gas. Also, development works are being pushed forward for a DPF (a DPF for catalyst regeneration) which comprises an oxidation catalyst carried on a conventional DPF and which can oxidize and burn the particulate matter deposited on the catalyst to continuously regenerate the catalyst. Refractory silicon carbide (SiC) is in use as one of the constitutional materials.

As such a honeycomb structure, for example, there is disclosed a porous silicon carbide-based catalyst carrier of honeycomb structure which is obtained in such way that silicon carbide as a starting material having a desired specific surface area and containing impurities is formed into an article of intended shape, dried, then fired in a temperature of 1600 to 2200° C. (see, e.g. Patent Document 1).

In the case of the catalyst carrier disclosed in Patent Document 1, in sintering (necking) by the recrystallization reaction of the silicon carbide particle per se, the silicon carbide component vaporizes from the surface of the silicon carbide particles and condensates at the contact area (necks) between the silicon carbide particles, thereby the necks grow to result in a bonded state. However, the vaporization of silicon carbide requires a very high firing temperature, which has invited high costs, and a material of high thermal expansion coefficient must be fired at a high temperature, which has led to a drawback of a low firing yield.

Also, when it is attempted to produce a filter of high porosity, particularly high porosity of 50% or more by the above-mentioned sintering in the recrystallization reaction of the silicon carbide particle per se, the sintering mechanism does not function sufficiently, thus the growth of necks is hindered, which has led to a drawback of a low strength of the resultant filter.

As the conventional technique to solve these problems, there is disclosed a porous honeycomb structure containing fire resistant particles of aggregate, particularly silicon carbide and metallic silicon, and the production method (see, e.g. Patent Document 2). According to such production method, a porous honeycomb structure can be produced at relatively low firing temperatures and low costs, one with high thermal conductivity and high strength can be obtained. Also, in compounding, addition of a pore former enables a resultant porous honeycomb structure to be high porosity.

High porosity is desired for such honeycomb structure from the viewpoint of lowering pressure loss. As a method for making a honeycomb structure to be higher porosity, there is a method where organic pore formers such as starch and foaming resin are added in larger amount to a raw-material mixture for porous materials containing silicon carbide particles and the like, followed by burning off the pore formers in firing.

However, when porosity is to be increased, the amount of pore former to be added becomes large, in the case where a large amount of organic compound type pore former is added, combustion heat becomes large as well as the amount of gas such as volatile organic substance and carbon dioxide generated in a degreasing (calcinating) stage becomes large. There are instances that the calcinated (degreased) article or fired article obtained under such conditions has cracks, tears and cuts due to gas generation and combustion heat, and defects such as large pores caused by agglomeration of organic pore former added largely, and formation of faulty portions which do not exhibit filter functions and cause leakage of fluid. Also, in the case of using an organic pore former, although the porosity can be increased by an increase in the amount of pore former added, there has been a problem that pore diameter becomes large at the same time.

In order to solve the above-described problems, there is disclosed a method that inorganic micro balloons containing Si and Al and a compound containing alkaline earth metal are added to a raw-material mixture containing silicon carbide particles and metallic silicon, then formed into an intended shape, the resultant green body is calcinated and fired to melt the micro balloons to obtain a porous article of porous structure where an oxide phase containing Si, Al and alkaline earth metal is present on surfaces of and/or at circumferences of the silicon carbide particles and/or the metallic silicon (see Patent Document 3).

However, the method described in Patent Document 3 must add a large amount of alkaline earth metal to melt inorganic micro balloons and form communicating pores, resulting from adding a large amount of alkaline earth metal, there has been a problem that dimensional change becomes large in firing.

Patent Document 1: JP-A-6-182228
Patent Document 2: JP-A-2002-201082
Patent Document 3: WO 2003/082770 A1

DISCLOSURE OF THE INVENTION

The present invention has been made in view of the above-mentioned problems of prior art, which aims at providing a porous article in such way that by firing a raw-material mixture added with organometallic compound particles, forming pores through volume shrinkage due to decomposition/conversion of the organometallic compound particles, the decomposed/converted substance of organometallic compound particles being present as an aggregate, porosity can be increased while maintaining pore diameter at an intended size as well as generation of large pores is reduced to give a sharp distribution of pore diameters. As a result, it can provide a silicon carbide-based porous article having high strength, low pressure loss and good dimensional accuracy, and a method for producing the same.

To achieve the above aims, the present invention is to provide a silicon carbide-based porous article described below and a method for producing the same.

[1] A silicon carbide-based porous article comprising silicon carbide particles as an aggregate, metallic silicon and an aggregate derived from organometallic compound particles to form pores through volume shrinkage due to decomposition/conversion by heat treatment.

[2] The silicon carbide-based porous article described in [1], wherein the aggregate derived from organometallic compound particles contains Si, O and C.

[3] The silicon carbide-based porous article described in [1] or [2], wherein the porosity is 45 to 70%, and the average pore diameter is 8 to 20 μm.

[4] The silicon carbide-based porous article described in any one of [1] to [3], wherein, when pore diameters $D_{10}$ and $D_{90}$ correspond to respective pore volumes $V_{10}$ and $V_{90}$ showing 10% and 90% of total pore volume, the value of $\log(D_{90})-\log(D_{10})$ is 0.4 or less in the distribution of pore diameters.

[5] A method for producing a silicon carbide-based porous article, comprising; adding organometallic compound particles to form pores through volume shrinkage due to decomposition/conversion by heat treatment to a raw-material mixture containing silicon carbide particles and metallic silicon, then forming into an intended shape, calcinating and/or firing the resultant green body, forming pores through volume shrinkage due to decomposition/conversion of the organometallic compound particles, and the decomposed/converted substance of the organometallic compound particles being present as an aggregate in the porous article.

[6] The method for producing the silicon carbide-based porous article described in [5], wherein the organometallic compound particles are added by 5 to 30 parts by mass.

[7] The method for producing the silicon carbide-based porous article described in [5] or [6], wherein the organometallic compound particles contain Si, O and C.

[8] The method for producing the silicon carbide-based porous article described in any one of [5] to [7], wherein the tap density of the organometallic compound particles is 0.6 g/cc or less.

[9] The method for producing the silicon carbide-based porous article described in any one of claims [5] to [8], wherein the average pore diameter of the organometallic compound particles is 10 to 70 μm.

[10] The method for producing the silicon carbide-based porous article described in any one of claims [5] to [9], wherein the intended shape is a honeycomb shape.

As described above, the silicon carbide-based porous article and the method for producing the same of the present invention form pores through volume shrinkage due to decomposition/conversion of the organometallic compound particles by firing a raw-material mixture added with organometallic compound particles. Also, porosity can be increased while maintaining pore diameter at an intended size as well as generation of large pores is reduced, and a porous article with sharp distribution of pore diameters can be obtained by providing the substance of organometallic compound particles decomposed and converted as an aggregate. As a result, there can be obtained a silicon carbide-based porous article having high strength, low pressure loss and good dimensional accuracy.

DESCRIPTION OF REFERENCE NUMERALS

1: silicon carbide particle, 2: metallic silicon, 2a: bonded metallic silicon, 3: organometallic compound particle, 3a: shrunk particle, 4: pore

BEST MODE FOR CARRYING OUT THE INVENTION

The silicon carbide-based porous article of the present invention and the method for producing the same will be described in detail based on specific embodiments below. The present invention is not restricted thereto for interpretation, and it should be construed that various change, modification, improvement can be made based on the knowledge of a person ordinary skill in the art as long as there is no deviation from the scope of the present invention.

Figure 1:
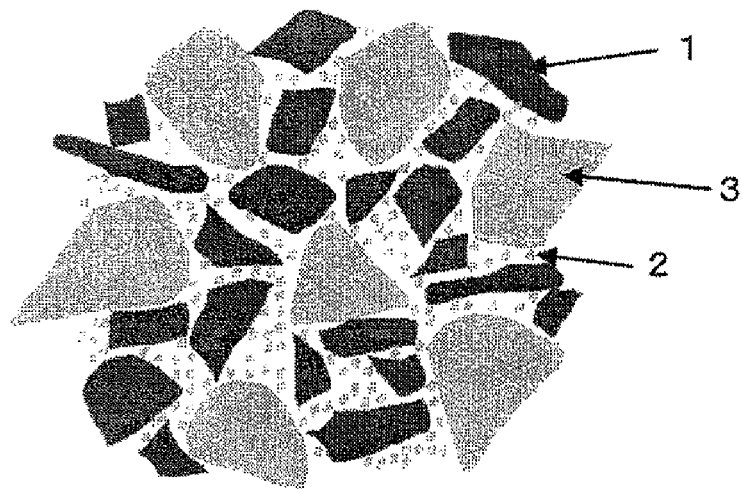
FIG. 1 is a schematic diagram illustrating an internal structure of green body containing silicon carbide particles, metallic silicon and organometallic compound particles before heat treatment.

FIG. 1 is a schematic diagram illustrating an internal structure of green body containing silicon carbide particles, metallic silicon and organometallic compound particles before heat treatment. As is shown in FIG. 1, for a green body prior to heat treatment, the inside of green body is filled up with silicon carbide particles 1, metallic silicon 2 and organometallic compound particles 3 to yield a state with few pores.

Figure 2:
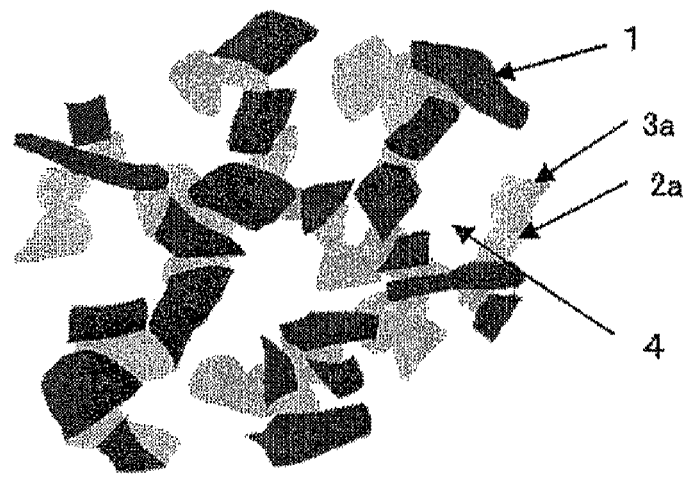
FIG. 2 is a schematic diagram illustrating an internal structure of sintered article containing silicon carbide particles, metallic silicon and organometallic compound particles after heat treatment.

On the other hand, FIG. 2 is a schematic diagram illustrating an internal structure of sintered article containing silicon carbide particles, metallic silicon and organometallic compound particles after heat treatment. As is shown in FIG. 2, after heat treatment, organometallic compound particle 3 shrinks markedly in volume to be a shrunk particle 3a, particles of metallic silicon 2 bond each other to form bonded metallic silicon 2a, simultaneously, bond the silicon carbide particle 1 and shrunk particle 3a present around them together to form a large pore 4.

As described above, the silicon carbide-based porous article of the present invention includes silicon carbide particles as an aggregate, metallic silicon and an aggregate derived from organometallic compound particles to form pores through volume shrinkage due to decomposition/conversion by heat treatment. Additionally, it is preferable that the aggregate derived from the organometallic compound particles contains Si, O and C, also, the organometallic compound particle is not particularly limited, it is more preferably a silicone resin particle.

On this basis, the silicon carbide-based porous article of the present invention can contribute to high strength, low pressure loss and good dimensional accuracy as follows: pores are formed through volume shrinkage due to decomposition/conversion of the organometallic compound particles by firing a raw-material mixture added with organometallic compound particles, and porosity can be increased while maintaining pore diameter at an intended size as well as generation of large pores is reduced, and a porous article with sharp distribution of pore diameters can be obtained by providing the substance of organometallic compound particles decomposed and converted as an aggregate.

The silicon carbide-based porous article of the present invention preferably has the porosity of 45 to 70%, and the average pore diameter of 8 to 20 μm. When the porosity is less than 45%, or the average pore diameter is less than 8 μm, for a DPF, in particular, a DPF for catalyst regeneration by coating catalyst components in pores afterwards, it is not preferable because the porosity and average pore diameter required for a constitutional porous material to effectively carry the catalyst components cannot be satisfied. Also, when the porosity is more than 70%, or the average pore diameter is more than 20 μm, strength is drastically lowered, which is not preferable because the durability of a DPF, or a DPF for catalyst regeneration becomes insufficient. Additionally, from the viewpoints of maintaining high strength as well as high porosity and low pressure loss, the silicon carbide-based porous article of the present invention has more preferably the porosity of 45 to 65%, and the average pore diameter of 8 to 20 μm, particularly preferably the porosity of 50 to 60%, and the average pore diameter of 8 to 15 μm.

Also, regarding the silicon carbide-based porous article of the present invention, the distribution of pore diameters is sharp, further in detail, when pore diameters $D_{10}$ and $D_{90}$ correspond to respective pore volumes $V_{10}$ and $V_{90}$ showing 10% and 90% of total pore volume, the value of $\log(D_{90})-\log(D_{10})$ is preferably 0.4 or less (more preferably 0.3 or less) in the distribution of pore diameters. Additionally, the smaller the difference between $D_{10}$ and $D_{90}$, the sharper is the distribution of pore diameters.

Additionally, the values of $D_{10}$ and $D_{90}$ used for evaluation in the present invention depend on the porosity, the higher the porosity, the larger become the values and the difference. Therefore, as an evaluation method for porous articles with different porosities, the difference between $\log(D_{90})$ and $\log(D_{10})$ was adopted for evaluation and the smaller the value of $\log(D_{90})-\log(D_{10})$, the sharper was the distribution of pore diameters in the evaluation.

As described above, since the silicon carbide-based porous article of the present invention can exhibit the characteristic as a material constituting a honeycomb structure for example, as well as it can provide excellent oxidation resistance, acid resistance, reaction resistance against particulate matter and thermal shock resistance, it can be preferably used under high SV (space velocity) condition as a DPF, DPF for catalyst regeneration, or catalyst carrier.

Next, the method for producing the silicon carbide-based porous article of the present invention will be described. In producing the silicon carbide-based porous article of the present invention, first a raw material mixture containing silicon carbide particles and metallic silicon is prepared. Additionally, silicon carbide particles and metallic silicon sometimes may contain a trace of impurities such as Fe, Al and Ca, they may be used as they are, or after purification by chemical treatment like cleaning with chemicals. Also, silicon dioxide and metal elements like alkaline earth may be added to improve the bonding between silicon carbide particles and metallic silicon.

To the raw-material mixture prepared, organometallic compound particles to form pores through volume shrinkage due to decomposition/conversion by heat treatment (bulky organometallic compound particles containing Si, C and O components) is added, then if necessary, forming auxiliaries such as organic binder are added thereto, mixed and kneaded to obtain a clay for forming.

Additionally, an organometallic compound particle exhibits action as pore former by adding to a raw-material mixture. Since it has a low specific gravity and suitable strength compared with organic type pore formers such as starch and foaming resin or inorganic particles conventionally used, it is hardly broken in mixing/kneading and easy to handle, In this case, organometallic compound particles may be changed for all of pore formers, or may be used in combination with organic type pore formers.

The clay thus obtained is formed into an intended form (e.g. honeycomb shape), the resultant green body is calcinated to remove (degrease) organic binders in the green body, firing is then conducted to give a silicon carbide-based porous article.

Herein, the above-described organometallic compound particles have different heat resistance depending on the composition. Even when organometallic compound particles thermally treated are decomposed and converted to other compounds, all of which are not disappeared, and some remains as a shrunk form; for example, in the case of heat treatment under an oxygen-excess atmosphere, all organic chains are burned, remaining —SiO is oxidized into $SiO_2$, also, in the case of thermal treatment under a low oxygen atmosphere, organic chain is not completely burned, and a glassy material containing Si, C and O is left. Further, the amount of gas generated in heat treatment is small compared with the case where organic type pore formers are used, so that there is an effect to prevent the resultant silicon carbide-based porous article from generating defects such as cracks, tears and cuts. Additionally, in this case, there is an effect of suppressing the amount of organic materials in concomitant use of organic type pore formers; the same effect described above is exhibited.

The main feature of the method for producing the silicon carbide-based porous article of the present invention is the addition of organometallic compound particles to form pores through volume shrinkage due to decomposition/conversion by heat treatment.

The method for producing the silicon carbide-based porous article of the present invention thereby can increase the amount of pore formers added in yielding high porosity by using the organometallic compound particles because of no burning and blowing off in firing, in comparison with the method that organic pore formers are mainly used as pore former, then the porosity can be increased while maintaining pore diameter at an intended size to give a porous article with sharp distribution of pore diameters. Also, it can greatly suppress a large amount of gas generation such as organic volatile substance and carbon dioxide in degreasing (calcinating) stage and combustion heat, which can suppress the generation of cracks, tears and cuts, generation of large pores resulting from agglomeration of pore formers as well. As a result, there can be obtained a silicon carbide-based porous article having high strength, low pressure loss and good dimensional accuracy.

Additionally, the organometallic compound particle used in the present invention is not particularly limited as long as the above requirements are satisfied; however, it is preferably a silicone resin particle. Herein, silicone means polyorganosiloxane, which is a polymer with inorganic siloxane bond (Si—O—Si) as its bone structure being not present in nature. There are present various shapes for silicone such as oily material, elastic rubber-like material and curable resin by heat based on the bone structure of silicone (two or three dimensional polymerization), polymerization degree, and organic groups inside chains, and the particles of silicone used in the present invention is also present. Further, the silicone particle is a composite particle of organic substance and metal (Si), and its specific gravity is as low as 0.97 to 1.3, the weight is also decreased due to decomposition loss of organic side chain by heat treatment, moreover, a part of organometallic compound is converted to a substance with high specific gravity like inorganic substance such as silica to decrease the volume markedly.

In this manner, the organometallic compound particle used in the present invention forms pores by decrease of volume (shrinkage), also is present as an aggregate containing Si, C and O due to decomposition, conversion and shrinkage of this particle. This shrunk aggregate depends on the composition and structures (kind of side chain, polymerization state, polymerization degree) of organometallic compound added, and heat treatment conditions, is present as a SiOC type particle. This particle shows behavior similar to silicon carbide in heat conduction and thermal expansion compared to crystalline inorganic substance such as $SiO_2$, and residue as aggregate is not disadvantageous in characteristics, which can form pores.

Also, in the method for producing the silicon carbide-based porous article of the present invention, the above organometallic compound particles are preferably added by 5 to 30 parts by mass (more preferably 10 to 30 parts by mass) relative to 100 parts by mass of the total amount of silicon carbide particle and metallic silicon. When the addition of the organometallic compound particles is less than 5 parts by mass, pore forming effect cannot be exhibited, whereas when the addition of the organometallic compound particles is more than 30 parts by mass, the amount of aggregate formed becomes too much, bonded part by metallic silicon decreases, which may damage the strength as silicon carbide-based porous article.

Additionally, in the method for producing the silicon carbide-based porous article of the present invention, to further enhance porosity, organic pore formers such as starch and foaming resin can be concomitantly used, it is necessary to consider the kind of organic pore former used and the amount added not to deteriorate the characteristics of silicon carbide-based porous article.

Further, in the method for producing the silicon carbide-based porous article of the present invention, tap density of organometallic compound particles is preferably 0.6 g/cc or less (more preferably 0.5 g/cc or less). The reason is that even in a bulky state of organometallic compound particle itself, when the particle diameter is small, packing between particles takes place, the tap density becomes high, thus the effect as pore former is lowered. On the other hand, when the particle diameter is large, it is possible to increase filling volume, but, in the case of high true specific gravity of particle itself, the tap density becomes too high. From the above viewpoints, it is possible to select organometallic compound particle for forming pores effectively in a silicon carbide-based porous article by controlling the tap density.

Additionally, tap density is bulk density measured by a tap method, a graduated cylinder filled with sample powders of a certain amount is repeatedly dropped from a certain distance, the bulkiness reached to a constant value is measured to be able to use as indexes showing the particle diameter and the bulkiness of particles themselves (pore volume, true density).

In the method for producing the silicon carbide-based porous article of the present invention, the average particle diameter of organometallic compound particles is preferably 10 to 70 μm (more preferably 30 to 50 μm) The reason is that a honeycomb structure with partition walls of about 300 μm in thickness can be surely extruded. Further, the lower limit of average diameter of organometallic compound particles depends on the size of silicon carbide particle as aggregate, the particles are filled between silicon carbide particles and lose the function as pore former when it is too small compared to the size of silicon carbide particle.

Also, in the method for producing the silicon carbide-based porous article of the present invention, calcination is preferably conducted at lower temperatures than melting temperature of metallic silicon. Specifically, it may be once held at a given temperature of about 150 to 700° C., further it may be carried out at a slow raising temperature speed of 50° C./hr or smaller in a given temperature. Herein, regarding a technique of once holding at a given temperature, the temperature may be maintained at only one temperature level or a plurality of temperature levels depending on the kind of organic binders used and the amount thereof, further, in the case of maintaining at a plurality of temperature levels, the holding time may be the same or different each other. Also, regarding a technique of slow raising temperature speed, the speed may be slowed only in a temperature region, or in a plurality of temperature regions, further in the case of plural regions, the speeds may be the same or different each other.

Next, in the method for producing the silicon carbide-based porous article of the present invention, to make a silicon carbide-based article obtained to be a porous structure that fire resistant particles therein are bonded by metallic silicon, it is necessary to soften metallic silicon in firing. Since the melting point of metallic silicon is 1410° C., firing temperature in firing is preferably 1410° C. or more. The optimum temperature is further determined from microstructure and characteristic. However, when the temperature exceeds 1600° C., evaporation of metallic silicon proceeds, because bonding through metallic silicon becomes difficult, the firing temperature is suitably 1410 to 1600° C., preferably 1420 to 1580° C. Also, silicon dioxide and metal elements such as alkaline earth may be added to improve bonding between silicon carbide particle and metallic silicon in firing.

EXAMPLES

The present invention will be described more specifically by way of Examples, however the present invention is in no way restricted to these Examples.

Example 1

A SiC raw material powder and a Si powder having an average particle diameter of 5 μm were compounded for the composition to be 80:20 by mass, to the resultant powder of 100 parts by mass was added 15 parts by mass of a resin type silicone resin particle having an average particle diameter of 12 μm (composition: $(CH_3SiO_{1.5})_n$; other characteristics are also shown in Table 1). Then, 6 parts by mass of methyl cellulose as organic binder, 2.5 parts by mass of surfactant and 24 parts by mass of water were added there to, uniformly mixed and kneaded to give a clay for forming. The resultant clay was formed by an extruder, dried to give a silicon carbide-based porous article having a partition wall thickness of 310 μm, a cell density of about 46.5 cells/cm² (300 cells/in.²), regular tetragon in section of one side of 35 mm and a length of 152 mm. The green body of silicon carbide-based porous article was plugged in both end faces for the end face to be a checkered pattern. Namely, the adjacent cells are plugged each other in the ends of opposite sides. As plugging material, a material similar to the raw material of silicon carbide-based porous article was used. The both end faces of cell were plugged, dried, then degreased at about 400° C. in ambient atmosphere, thereafter, fired at about 1450° C. in Ar inert atmosphere, thereby to produce a silicon carbide-based porous article (Example 1).

Example 2

It was conducted in the same manner as in Example 1 except that auxiliary components (SrO, $SiO_2$) shown in Table 1 were further added in Example 1.

Example 3

It was conducted in the same manner as in Example 1 except that a resin type silicone resin particle (composition $(CH_3SiO_{1.5})_n$) with an average particle diameter of 2 μm was used in Example 1.

Example 4

It was conducted in the same manner as in Example 3 except that auxiliary components (SrO, $SiO_2$) shown in Table 1 were further added in Example 3.

Example 5

It was conducted in the same manner as in Example 1 except that a resin-rubber composite type silicone resin particle with an average particle diameter of 30 μm (composition: mixture of $(CH_3SiO_{1.5})_n$, and $((CH_3)_2SiO)_n$) was used in Example 1.

Example 6

It was conducted in the same manner as in Example 5 except that auxiliary components (SrO, $SiO_2$) shown in Table 1 were further added in Example 5.

Example 7

It was conducted in the same manner as in Example 5 except that 10 parts by mass of starch as organic pore former was further added in Example 5.

Example 8

It was conducted in the same manner as in Example 1 except that 5 parts by mass of a rubber type silicone resin particle with an average particle diameter of 40 μm (composition: $((CH_3)_2SiO)_n$) was added in Example 1.

Example 9

It was conducted in the same manner as in Example 8 except that 15 parts by mass of a rubber type silicone resin particle with an average particle diameter of 40 μm (composition: $((CH_3)_2SiO)_n$) was added in Example 8.

Example 10

It was conducted in the same manner as in Example 8 except that 25 parts by mass of a rubber type silicone resin particle with an average particle diameter of 40 μm (composition: $((CH_3)_2SiO)_n$) was added in Example 8.

Example 11

It was conducted in the same manner as in Example 9 except that auxiliary components (SrO, $SiO_2$) shown in Table 1 were further added in Example 9.

Comparative Example 1

It was conducted in the same manner as in Example 1 except that no silicone resin particle was added in Example 1.

Comparative Example 2

It was conducted in the same manner as in Comparative Example 1 except that 10 parts by mass of starch as organic pore former and auxiliary components (SrO, $SiO_2$) shown in Table 1 were added in Comparative Example 1.

Comparative Examples 3 and 4

They were conducted in the same manner as in Comparative Example 2 except that the organic pore former was 20 parts by mass (Comparative Example 3) and 25 parts by mass (Comparative Example 4) in Comparative Example 2.

Comparative Example 5

It was conducted in the same manner as in Example 1 except that silica gel with an average particle diameter of 43 μm was used in Example 1.

The organometallic particles used and the resultant silicon carbide-based porous articles (Examples 1 to 11 and Comparative Examples 1 to 5) were evaluated in the following methods. The results are shown in Tables 1 and 2.

Evaluation Method of Organometallic Particle (Pore Former)

(1) Particle diameter: an average particle diameter was measured using a laser diffraction/scattering type particle size analyzer.

(2) Tap density: the sample powder of known weight was filled in a graduated cylinder, repeatedly dropped from a certain distance, the volume when the bulkiness became constant was measured to determine a tap density.

Evaluation Method of Characteristics (1) Porosity: a plate with partition wall thickness was cut out from the silicon carbide-based porous article obtained, which was measured in the Archimedes' method.

(2) Average pore diameter and pore volume: a test sample was cut out from the silicon carbide-based porous article obtained, which was measured with a mercury porosimeter.

(3) Sharpness evaluation of pore diameter distribution: From the results measured with a mercury porosimeter, the total pore volume, 10% ($V_{10}$) and 90% ($V_{90}$) volumes of the total pore volume were calculated. Pore diameters of $D_{10}$ and $D_{90}$ corresponding to $V_{10}$ and $V_{90}$, respectively were calculated from the relationship between pore diameter and integrated pore volume.

(4) Thermal expansion coefficient: an average coefficient of linear thermal expansion was measured in accordance with the method described in JIS R1618.

(5) Thermal conductivity: it was measured with a laser flash thermal constant tester in accordance with the method described in JIS R1611.

(6) Evaluation of aggregate particle: the surface microstructure of fired article obtained was observed by SEM/EDS to examine the components of aggregate-shaped particle. The case where particles containing elements of Si, C and O were present in the fired article was evaluated as ○.

TABLE 1

| | Organometallic compound pore former (inorganic pore former) | | | | Auxiliary Type (ms %) | Organic pore former Type (ms %) |
|---|---|---|---|---|---|---|
| | Composition | Particle diameter μm | Tap density g/cc | Amount of pore former Mass % | | |
| Example 1 | Resin type | 12 | 0.49 | 15 | — | — |
| Example 2 | (CH$_3$SiO$_{1.5}$)n | | | 15 | SrO (2.0) SiO$_2$ (1.0) | — |
| Example 3 | Resin type | 2 | 0.63 | 15 | — | — |
| Example 4 | (CH$_3$SiO$_{1.5}$)n | | | 15 | SrO (2.0) SiO$_2$ (1.0) | — |
| Example 5 | Composite type | 30 | 0.40 | 15 | — | — |
| Example 6 | (CH$_3$SiO$_{1.5}$)n + | | | 15 | SrO (2.0) SiO$_2$ (1.0) | — |
| Example 7 | ((CH$_3$)$_2$SiO)n | | | 15 | — | Starch (10) |
| Example 8 | Rubber type | 43 | 0.39 | 5 | — | — |
| Example 9 | ((CH$_3$)$_2$SiO)n | | | 15 | — | — |
| Example 10 | | | | 25 | — | — |
| Example 11 | | | | 15 | SrO (2.0) SiO$_2$ (1.0) | — |
| Comparative Example 1 | — | | | — | — | — |
| Comparative Example 2 | | | | — | SrO (2.0) SiO$_2$ (1.0) | Starch (10) |
| Comparative Example 3 | | | | — | SrO (2.0) SiO$_2$ (1.0) | Starch (20) |
| Comparative Example 4 | | | | — | SrO (2.0) SiO$_2$ (1.0) | Starch (25) |
| Comparative Example 5 | Silica gel (SiO$_2$) | 43 | 0.50 | 15 | — | — |

TABLE 2

| | Characteristics of fired article | | | | | Sharpness evaluation of pore | | | | | | Observation |
|---|---|---|---|---|---|---|---|---|---|---|---|---|
| | Porosity % | Average pore diameter μm | Pore volume ml/g | Thermal conductivity W/m·K | Linear thermal expansion coefficient ×10$^{-6}$/K | 10% pore volume (V$_{10}$) ml/g | 90% pore volume (V$_{90}$) ml/g | 10% pore diameter (D$_{10}$) μm | 90% pore diameter (D$_{90}$) μm | 10 to 90% range of pore diameter μm | log (D$_{90}$)- log (D$_{10}$) | results of SEM/EDS, existence of SiOC type particle |
| Example 1 | 51.0 | 8.7 | 0.33 | 12.3 | 4.49 | 0.03 | 0.30 | 4.9 | 9.9 | 5.1 | 0.31 | ○ |
| Example 2 | 45.5 | 9.9 | 0.31 | 14.4 | 4.47 | 0.03 | 0.28 | 6.7 | 11.2 | 1.6 | 0.23 | ○ |
| Example 3 | 39.3 | 5.2 | 0.23 | — | — | 0.02 | 0.21 | 2.4 | 6.0 | 3.6 | 0.40 | — |
| Example 4 | 37.0 | 6.3 | 0.19 | — | — | 0.02 | 0.17 | 4.9 | 9.9 | 5.1 | 0.31 | — |
| Example 5 | 57.2 | 12.6 | 0.44 | 11.3 | 4.40 | 0.04 | 0.39 | 7.6 | 16.0 | 8.4 | 0.32 | ○ |
| Example 6 | 53.3 | 13.3 | 0.37 | 10.8 | 4.33 | 0.04 | 0.33 | 8.3 | 15.7 | 7.3 | 0.27 | ○ |
| Example 7 | 64.8 | 15.1 | 0.51 | 7.8 | 4.41 | 0.05 | 0.46 | 9.4 | 20.8 | 11.4 | 0.34 | ○ |
| Example 8 | 45.3 | 8.9 | 0.30 | 15.1 | 4.44 | 0.03 | 0.27 | 5.5 | 12.4 | 6.9 | 0.35 | ○ |
| Example 9 | 51.1 | 10.0 | 0.34 | 12.9 | 4.46 | 0.03 | 0.31 | 6.0 | 12.7 | 6.7 | 0.33 | ○ |
| Example 10 | 58.9 | 11.8 | 0.48 | 8.9 | 4.43 | 0.05 | 0.43 | 6.4 | 15.1 | 8.7 | 0.37 | ○ |
| Example 11 | 48.2 | 12.1 | 0.30 | 15.2 | 4.32 | 0.03 | 0.27 | 7.8 | 15.1 | 7.3 | 0.29 | ○ |
| Comparative Example 1 | 42.1 | 8.0 | 0.22 | 28.9 | 4.39 | 0.02 | 0.20 | 5.4 | 8.9 | 3.5 | 0.22 | — |
| Comparative Example 2 | 48.8 | 10.9 | 0.31 | 12.4 | 4.34 | 0.03 | 0.28 | 4.6 | 12.3 | 7.7 | 0.43 | — |
| Comparative Example 3 | 60.0 | 19.9 | 0.48 | 8.3 | 4.43 | 0.05 | 0.43 | 9.3 | 25.1 | 15.8 | 0.43 | — |
| Comparative Example 4 | 62.6 | 22.1 | 0.56 | 6.1 | 4.44 | 0.06 | 0.50 | 10.5 | 28.1 | 17.6 | 0.43 | — |
| Comparative Example 5 | 57.1 | 13.9 | 0.45 | 5.1 | 4.68 | 0.05 | 0.41 | 7.9 | 17.6 | 9.7 | 0.35 | x (SiO$_2$ only) |

Discussions: Examples 1 to 11 and Comparative Examples 1 to 5

From the results of Tables 1 and 2, the organometallic compounds (silicone resin particles) used in Examples 1, 2, and 5 to 11 have a tap density of 0.6 g/cc or less, and satisfy the average particle diameter of 10 to 70 μm, the compositions also contain Si, C and O. Also, by adding these organometallic compounds (silicone resin particles) of 5 to 30% by mass (ms %), a porous article with a porosity of 45 to 70% and an average pore diameter of 8 to 20 μm was able to be produced.

In the case of using a pore former with a small particle diameter (10 μm or less) (Examples 3 and 4), there was no pore forming effect. Low porosity and small pore diameter were provided compared with the case of no addition of pore former (Comparative Example 1) because the organometallic compound particles added were left as aggregate.

Also, since the porous articles obtained in Examples 1 to 11 were left as aggregate in a state that the organometallic compounds (silicone resin particles) of pore formers were decomposed, converted and contracted, in comparison with the case pore-formed with organic pore formers (Comparative Examples 2 to 4), the distribution of pore diameters was sharp (the value of log(D$_{90}$)–log(D$_{10}$) became smaller than that of Comparative Example). Additionally, in the porous articles shown in Examples 1 to 11, it was confirmed by the observation of SEM/EDS that the particles added as pore former shrunk and were present as aggregate particles containing Si, O and C.

It was confirmed that the aggregate particles obtained in Examples 1 to 11 exhibited thermal properties similar to that of silicon carbide of base material (for example, linear thermal expansion coefficients in Examples 1 to11 and Comparative Examples 1 to 4 were at the same level, thermal conductivity of Examples 5 and 10 with almost equal porosity was also at the same level as Comparable Example 3). Further, excellent characteristic was able to be obtained even in the case where the organometallic compounds (silicone resin particles) and organic pore former were in concomitant use (Example 7).

On the other hand, in the case of adding silica gel which forms pores through shrinkage (Comparative Example 5), the particles added as pore former were present as siliceous aggregate particles, which led to increase in thermal expansion and decrease in thermal conductivity (for example, Comparative Example 5 had a definitely low thermal conductivity when compared with Example 5, 10 and Comparative Example 3 with almost equal porosity).

INDUSTRIAL APPLICABILITY

The silicon carbide-based porous article and the production method of the same of the present invention can be preferably used in production of trapping filters for exhaust gas, particularly, a diesel particulate filter (DPF) trapping particulate matter (particulate) in exhaust gas of diesel engine.

The invention claimed is:

1. A silicon carbide-based porous article comprising:
   silicon carbide particles as an aggregate, metallic silicon; and
   shrunken organometallic compound particles that are shrunken from an aggregate derived from organometallic compound particles to form pores through volume shrinkage due to decomposition/conversion by heat treatment.

2. The silicon carbide-based porous article of claim 1, wherein the aggregate derived from organometallic compound particles contains Si, O and C.

3. The silicon carbide-based porous article of claim 1, wherein the porosity is 45 to 70%, and the average pore diameter is 8 to 20 μm.

4. A silicon carbide-based porous article comprising:
   silicon carbide particles as an aggregate, metallic silicon, and
   an aggregate derived from organometallic compound particles to form pores through volume shrinkage due to decomposition/conversion by heat treatment,
   wherein, when pore diameters $D_{10}$ and $D_{90}$ correspond to respective pore volumes $V_{10}$ and $V_{90}$ showing 10% and 90% of total pore volume, the value of $\log(D_{90})-\log(D_{10})$ is 0.4 or less in the distribution of pore diameters.

5. The silicon carbide-based porous article of claim 4, wherein the organometallic compound particles are silicon resin particles.

6. The silicon carbide-based porous article of claim 1, wherein the organometallic compound particles are silicon resin particles.

7. A method for producing a silicon carbide-based porous article, comprising; adding organometallic compound particles to form pores through volume shrinkage due to decomposition/conversion by heat treatment to a raw-material mixture containing silicon carbide particles and metallic silicon, then forming into an intended shape, calcinating and/or firing the resultant green body, forming pores through volume shrinkage due to decomposition/conversion of the organometallic compound particles, and the decomposed/converted substance of the organometallic compound particles being present as an aggregate in the porous article.

8. The method for producing the silicon carbide-based porous article of claim 7, wherein the organometallic compound particles are added by 5 to 30 parts by mass.

9. The method for producing the silicon carbide-based porous article of claim 7, wherein the organometallic compound particles contain Si, O and C.

10. The method for producing the silicon carbide-based porous article of claim 7, wherein the tap density of the organometallic compound particles is 0.6 g/cc or less.

11. The method for producing the silicon carbide-based porous article of claim 7, wherein the average pore diameter of the organometallic compound particles is 10 to 70 μm.

12. The method for producing the silicon carbide-based porous article of claim 7, wherein the intended shape is a honeycomb shape.

* * * * *

UNITED STATES PATENT AND TRADEMARK OFFICE
CERTIFICATE OF CORRECTION

| | | |
|---|---|---|
| PATENT NO. | : 7,781,053 B2 | Page 1 of 1 |
| APPLICATION NO. | : 12/194015 | |
| DATED | : August 24, 2010 | |
| INVENTOR(S) | : Takuya Hiramatsu et al. | |

It is certified that error appears in the above-identified patent and that said Letters Patent is hereby corrected as shown below:

On the Title Page,

Please delete the following:

Item "(73) Assignee:    NGX Insulators, Inc., Nagoya (JP)"

And Replace with:

Item (73) Assignee:    NGK Insulators, Inc., Nagoya (JP)

Signed and Sealed this

Twenty-sixth Day of October, 2010

David J. Kappos
*Director of the United States Patent and Trademark Office*